(12) United States Patent
Ota

(10) Patent No.: US 12,510,430 B2
(45) Date of Patent: Dec. 30, 2025

(54) WATERPROOF PRESSURE SENSOR INCLUDING WATERPROOF GEL WITH COVERING PORTIONS AND METHOD FOR MANUFACTURING THE SAME

(71) Applicant: Murata Manufacturing Co., Ltd., Nagaokakyo (JP)

(72) Inventor: Mari Ota, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 430 days.

(21) Appl. No.: 18/123,368

(22) Filed: Mar. 20, 2023

(65) Prior Publication Data

US 2023/0228640 A1    Jul. 20, 2023

Related U.S. Application Data

(63) Continuation of application No. PCT/JP2021/027311, filed on Jul. 21, 2021.

(30) Foreign Application Priority Data

Sep. 30, 2020   (JP) .................................. 2020-164743

(51) Int. Cl.
*G01L 19/06*    (2006.01)

(52) U.S. Cl.
CPC ................................. *G01L 19/0627* (2013.01)

(58) Field of Classification Search
None
See application file for complete search history.

(56) References Cited

U.S. PATENT DOCUMENTS

| 6,674,172 | B2* | 1/2004 | Vincent | H01L 24/83 |
|  |  |  |  | 257/E21.503 |
| 11,532,532 | B2* | 12/2022 | Vincent | H01L 23/315 |
| 2004/0093954 | A1 | 5/2004 | Gottlieb et al. | |
| 2014/0110801 | A1 | 4/2014 | Higgins, III | |
| 2017/0284885 | A1 | 10/2017 | Okawa et al. | |
| 2020/0357715 | A1 | 11/2020 | Vincent | |

FOREIGN PATENT DOCUMENTS

| CN | 106908176 B | * | 3/2020 | ............. G01L 1/142 |
| JP | 2001013023 A | * | 1/2001 | |
| JP | 2014085337 A |  | 5/2014 | |
| JP | 2017181302 A |  | 10/2017 | |
| JP | 2017190992 A |  | 10/2017 | |
| JP | 2019219222 A | * | 12/2019 | |

OTHER PUBLICATIONS

International Search Report in PCT/JP2021/027311, mailed on Aug. 31, 2021, 3 pages.
Written Opinion in PCT/JP2021/027311, mailed on Aug. 31, 2021, 5 pages.

* cited by examiner

*Primary Examiner* — Peter J Macchiarolo
*Assistant Examiner* — Jermaine L Jenkins
(74) *Attorney, Agent, or Firm* — Keating & Bennett, LLP

(57) ABSTRACT

A pressure sensor includes a housing with an opening, a pressure sensitive body inside the housing, a waterproof gel to seal the pressure sensitive body inside the housing, and cover portions on a surface of the gel. The cover portions are non-adhesive and do not couple to each other.

20 Claims, 7 Drawing Sheets

WATERPROOF PRESSURE SENSOR INCLUDING WATERPROOF GEL WITH COVERING PORTIONS AND METHOD FOR MANUFACTURING THE SAME

CROSS REFERENCE TO RELATED APPLICATIONS

This application claims the benefit of priority to Japanese Patent Application No. 2020-164743 filed on Sep. 30, 2020 and is a Continuation Application of PCT Application No. PCT/JP2021/027311 filed on Jul. 21, 2021. The entire contents of each application are hereby incorporated herein by reference.

BACKGROUND OF THE INVENTION

1. Field of the Invention

The present invention relates to a waterproof pressure sensor in which a pressure sensitive device is sealed, and a method for manufacturing the pressure sensor.

2. Description of the Related Art

Conventionally, as this type of pressure sensor, for example, a pressure sensor disclosed in Japanese Unexamined Patent Application Publication No. 2017-181302 is known.

The pressure sensor disclosed in Japanese Unexamined Patent Application Publication No. 2017-181302 includes a housing in which an opening is formed, a pressure detection device provided inside the housing at a position opposed to the opening, and a gel which seals the pressure detection device inside the housing. Pressure is applied to the pressure detection device through the gel. The gel has high adhesiveness so that the gel closely contacts the housing and the pressure detection device and prevents water from entering the pressure detection device.

SUMMARY OF THE INVENTION

However, in the pressure sensor disclosed in Japanese Unexamined Patent Application Publication No. 2017-181302, the gel has high adhesiveness, and thus foreign matter may easily adhere to a surface of the gel. The foreign matter adhering to the gel may cause a change in characteristics of the pressure sensor. Further, removal of the foreign matter adhering to the gel is difficult.

Therefore, preferred embodiments of the present invention provide pressure sensors in each of which foreign matter is less likely to adhere to a gel and a change in characteristics of the pressure sensor is reduced or prevented.

A pressure sensor according to a preferred embodiment of the present invention includes a housing with an opening, a pressure sensitive body inside the housing, a waterproof gel to seal the pressure sensitive body inside the housing, and a plurality of cover portions a surface of the gel, wherein the plurality of cover portions are non-adhesive and do not couple to each other.

According to preferred embodiments of the present invention, foreign matter is less likely to adhere to the gel and a change in characteristics of the pressure sensor is reduced or prevented.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
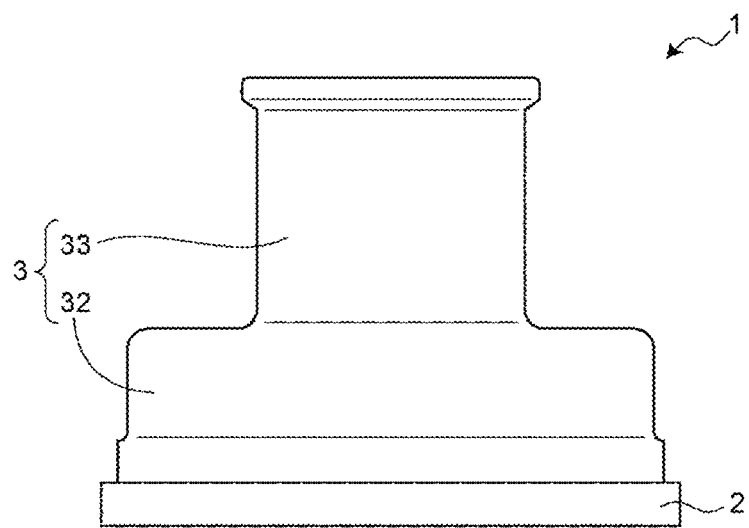
FIG. 1 is a side view of a pressure sensor according to a first preferred embodiment of the present invention.

A pressure sensor according to an aspect of a preferred embodiment of the present invention includes a housing with an opening, a pressure sensitive body inside the housing, a waterproof gel to seal the pressure sensitive body inside the housing, and a plurality of cover portions on a surface of the gel, wherein the plurality of cover portions are non-adhesive and do not couple to each other.

In this configuration, since the surface of the gel is covered by the plurality of cover portions, adhesion of foreign matter to the gel is prevented. Moreover, since the plurality of cover portions are non-adhesive, foreign matter adhering to the cover portions may easily be removed. Therefore, a change in characteristics of the pressure sensor may be reduced or prevented.

Further, since the plurality of cover portions do not couple to each other, a cover structure defined by the plurality of cover portions adhering to the surface of the gel at multiple points cannot be formed. Therefore, since stress against deformation of the gel is not caused, a change in characteristics of the pressure sensor due to a change in stress may be reduced or prevented. Moreover, since foreign matter does not reach the surface of the gel through a gap in the covering structure, a change in characteristics of the pressure sensor may be further reduced or prevented.

Preferably, the plurality of cover portions include particles with a spherical shape or a substantially spherical shape.

In this configuration, a contact area between each cover portion and the surface of the gel is smaller than when each cover portion has another shape. Therefore, adhesion of each cover portion to the surface of the gel is less likely to be affected by deformation of the gel. That is, during use of the pressure sensor, the cover portions are less likely to come off from the surface of the gel. Therefore, the effect to prevent adhesion of foreign matter to the gel is more reliably provided, and a change in characteristics of the pressure sensor may be further reduced or prevented.

Preferably, the plurality of cover portions include two or more types of particles with sphere radii different from each other.

In this configuration, the plurality of cover portions include at least large particles and small particles. In this case, when the plurality of cover portions are laid on the surface of the gel, the small particles may fill gaps between the large particles. Therefore, when compared to the case where the plurality of cover portions include only the large particles, a larger area of the surface of the gel is covered by the plurality of cover portions. Thus, adhesion of foreign matter to the gel is further prevented, and a change in characteristics of the pressure sensor may be more reliably reduced or prevented.

Preferably, the plurality of cover portions satisfy the following formula, where Ra is a sphere radius of an n-th largest particle, and Rb is a sphere radius of an (n+1)-th largest particle.

$$Rb < (\sqrt{2}-1)Ra \quad \text{Math. 1}$$

In this configuration, when the plurality of cover portions are laid on the surface of the gel, (n+1)-th largest particles may be more reliably positioned in gaps between n-th largest particles. Therefore, a larger area of the surface of the gel is covered by the plurality of cover portions. Thus, adhesion of foreign matter to the gel is further prevented, and a change in characteristics of the pressure sensor may be more reliably reduced or prevented.

Preferably, each of the plurality of cover portions includes at least one of a silicone particle, a silica particle, and an acrylic based particle.

In this configuration, the plurality of cover portions which are non-adhesive and do not couple to each other can be provided.

A method for manufacturing a pressure sensor according to an aspect of a preferred embodiment of the present invention includes preparing an assembly including a housing with an opening, a pressure sensitive body inside the housing, and a waterproof gel to seal the pressure sensitive body inside the housing, and laying a plurality of cover portions on a surface of the gel.

In this method, since the surface of the gel is covered by the plurality of cover portions, adhesion of foreign matter to the gel is prevented. Therefore, a change in characteristics of the pressure sensor may be reduced or prevented.

Further, the manufacturing method may further include discharging, from the opening, a cover portion not adhering to the surface of the gel.

In this method, since the cover portion not adhering to the surface of the gel is discharged, the cover portion is prevented from moving above the gel or flowing out from the opening during the use of the pressure sensor. Therefore, the magnitude and distribution of the pressure applied to the gel are not changed by the cover portion during the use of the pressure sensor, and thus, a change in characteristics of the pressure sensor may be reduced or prevented.

Further, in the manufacturing method, the plurality of cover portions may include two or more types of particles with a spherical shape or a substantially spherical shape and with sphere radii different from each other.

In this method, each cover portion rolls more easily than when each cover portion has another shape. Therefore, when the cover portions are laid on the surface of the gel, each cover portion is less likely to stay on another cover portion, and may more easily reach the surface of the gel. If this is utilized, when the plurality of cover portions are laid on the surface of the gel, each cover portion is not required to be disposed at a position determined in advance, and thus the cover portions are easier to position.

Further, since the plurality of cover portions roll so as to fill gaps therebetween on the surface of the gel, the gaps between the cover portions are more reliably filled. Therefore, a larger area of the surface of the gel is covered by the plurality of cover portions. Thus, adhesion of foreign matter to the gel is further prevented, and a change in characteristics of the pressure sensor may be more reliably reduced or prevented.

Further, in this method, the plurality of cover portions may include at least large particles and small particles. In this case, when the plurality of cover portions are laid on the surface of the gel, the small particles may fill the gaps between the large particles. Therefore, when compared to the case where the plurality of cover portions include only the large particles, a larger area of the surface of the gel is covered by the plurality of cover portions. Thus, adhesion of foreign matter to the gel is further prevented, and a change in characteristics of the pressure sensor may be more reliably reduced or prevented.

Further, the manufacturing method may further include laying a plurality of additional cover portions smaller than the cover portions on the surface of the gel after the laying step.

In this method, when compared to the case where the plurality of additional cover portions are laid at the same time as the plurality of cover portions, the plurality of smaller additional cover portions may be more reliably disposed in the gaps between the cover portions. Therefore, a larger area of the surface of the gel is covered by the plurality of cover portions and the plurality of smaller additional cover portions. Thus, adhesion of foreign matter to the gel is further prevented, and a change in characteristics of the pressure sensor may be more reliably reduced or prevented.

Further, the manufacturing method may further include discharging, from the opening, a smaller additional cover portion not adhering to the surface of the gel after the above-described additional laying step.

Further, in this manufacturing method, since the smaller additional cover portion not adhering to the surface of the gel is discharged, the smaller additional cover portion is prevented from moving above the gel or flowing out from the opening. Therefore, the magnitude and distribution of the pressure applied to the gel are not changed by the small additional cover portion during the use of the pressure sensor, and thus, a change in characteristics of the pressure sensor may be reduced or prevented.

Hereinafter, preferred embodiments of the present invention are described with reference to the drawings. Note that the present invention is not limited by the preferred embodiments described below.

Further, in the drawings, the same reference characters are given to the substantially same components to omit description.

Although terms indicative of directions such as "upper surface", "lower surface", and "side surface" are used below for convenience of description, they are not intended to limit, for example, the state in which pressure sensors according to preferred embodiments of the present invention are used.

First Preferred Embodiment

Figure 2:
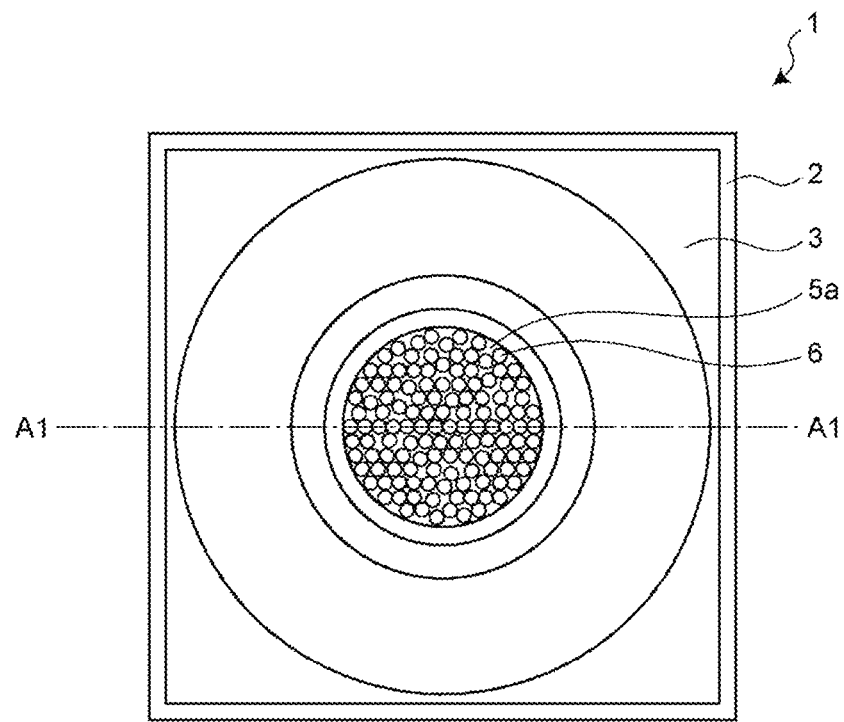
FIG. 2 is a plan view of the pressure sensor in FIG. 1.
Figure 3:
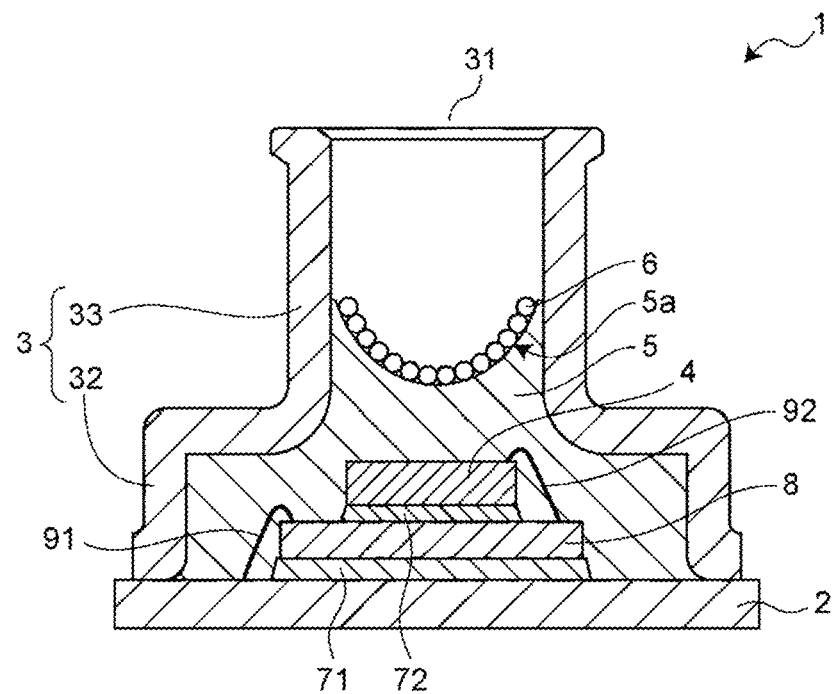
FIG. 3 is a sectional view taken along line A1-A1 in FIG. 2.

A pressure sensor according to a first preferred embodiment of the present invention is described with reference to FIGS. 1 to 3. FIG. 1 is a side view of the pressure sensor according to the first preferred embodiment of the present invention. FIG. 2 is a plan view of the pressure sensor in FIG. 1. FIG. 3 is a sectional view taken along line A1-A1 in FIG. 2.

As illustrated in FIG. 1, a pressure sensor 1 according to the first preferred embodiment includes a substrate 2 and a tubular member 3 provided on one surface of the substrate 2. The substrate 2 and the tubular member 3 define one example of a "housing". As illustrated in FIG. 3, inside the tubular member 3, the substrate 2 is provided with a pressure sensitive device 4. The pressure sensitive device 4 is sealed by a gel 5 provided inside the tubular member 3. A surface 5a of the gel 5 is provided with a plurality of covering members 6.

The substrate 2 may be, for example, a PCB substrate, a lead frame, or the like. In this preferred embodiment, the substrate 2 is a ceramic substrate.

The tubular member 3 is joined at one end portion thereof to the one surface of the substrate 2 so that the gel 5 in an unhardened state does not leak out. For example, an epoxy based adhesive agent or the like may be used for the joining. In this preferred embodiment, the tubular member 3 is joined to an electrode (not illustrated) of the substrate 2 with a conductive paste (not illustrated) interposed therebetween.

An opening 31 is formed at an end portion of the tubular member 3 on the opposite side from the substrate 2.

The tubular member 3 may have a tubular shape with a cross section such as a circular cross section, a rectangular cross section, or a polygonal cross section.

In this preferred embodiment, the tubular member 3 has a large-diameter portion 32 having a cylindrical shape, and a small-diameter portion 33 having a cylindrical shape with a diameter smaller than that of the large-diameter portion 32. The large-diameter portion 32 is joined at one end portion thereof to the substrate 2. The small-diameter portion 33 is joined at one end portion thereof to an end portion of the large-diameter portion 32 on the opposite side from the substrate 2. Further, the opening 31 is located at the other end portion of the small-diameter portion 33.

The small-diameter portion 33 is provided so that an O-ring (not illustrated) is attached thereto when the pressure sensor 1 is attached to another component. The O-ring is attached to an outer side portion of the small-diameter portion 33. Note that the small-diameter portion 33 need not necessarily be provided if the O-ring is not used.

The tubular member 3 is made of, for example, a metal such as stainless steel, a ceramic such as alumina, or the like.

In this preferred embodiment, the tubular member 3 is made of stainless steel. Therefore, the tubular member 3 is electrically connected to the substrate 2 with the conductive paste and the electrode interposed therebetween. Note that the substrate 2 and the tubular member 3 need not necessarily be electrically connected to each other.

As illustrated in FIG. 3, inside the tubular member 3, an integrated circuit chip 8 is joined to the substrate 2 with a die attach material 71 interposed therebetween. The integrated circuit chip 8 controls the pressure sensitive device 4.

In this preferred embodiment, the integrated circuit chip 8 is an application specific integrated circuit (ASIC) chip.

The pressure sensitive device 4 is provided over the integrated circuit chip 8 with a die attach material 72 interposed therebetween. The pressure sensitive device 4 has a diaphragm which detects a change in pressure caused by deflection deformation.

Each of the die attach materials 71 and 72 may be, for example, a paste-like die attach material, a die attach film, or the like. In this preferred embodiment, the die attach materials 71 and 72 are die attach films.

The pressure sensitive device 4, the integrated circuit chip 8, and the substrate 2 are electrically connected to each other. These electrical connections may be achieved, for example, by bumps, substrate wiring, or the like. In this preferred embodiment, the substrate 2 and the integrated circuit chip 8 are connected to each other by a bonding wire 91. Further, the integrated circuit chip 8 and the pressure sensitive device 4 are connected to each other by a bonding wire 92.

The pressure sensitive device 4 and the integrated circuit chip 8 are sealed by the gel 5 provided inside the tubular member 3. The gel 5 is obtained by pouring an unhardened gel into the tubular member 3 from the opening 31 and hardening the gel. The gel 5 transmits pressure applied to its surface 5a to the diaphragm of the pressure sensitive device 4.

Further, the gel 5 has adhesiveness, and closely contacts the substrate 2, the tubular member 3, the pressure sensitive device 4, the integrated circuit chip 8, the die attach materials 71 and 72, and the bonding wires 91 and 92. Therefore, entry of water into the substrate 2, the pressure sensitive device 4, the integrated circuit chip 8, and the bonding wires 91 and 92 is prevented. Thus, the pressure sensor 1 has a waterproof property.

The gel 5 may be, for example, a fluorocarbon based gel, a fluorosilicone based gel, or the like. In this preferred embodiment, the gel 5 is a silicone gel.

A plurality of covering members 6 are laid on the surface 5a of the gel 5. Herein, "lay" means that the plurality of covering members 6 are spread so as to cover a large portion of the surface 5a of the gel 5.

The plurality of covering members 6 have adhered to the surface 5a of the gel 5 because of the adhesiveness of the gel 5. The plurality of covering members 6 cover the surface 5a of the gel 5, thus preventing foreign matter from adhering to the gel 5.

The plurality of covering members 6 are non-adhesive and do not couple to each other. Herein, "non-adhesive" means a state in which foreign matter adhering to the covering members may easily be separated therefrom. Further, "coupling" means a connection which is not easily broken when a force to separate the covering members 6 from each other is applied, and includes, for example, a connection between atoms, a connection caused by adhesiveness, and a connection caused by magnetic attraction, electrostatic attraction, or the like.

Since the plurality of covering members 6 are non-adhesive, foreign matter adhering to the covering members 6 may easily be removed, for example, by running water or the like.

If the plurality of covering members 6 couple to each other, the plurality of covering members 6 each adhere to the surface 5a of the gel 5 and couple to each other. That is, a covering structure which is formed by the plurality of covering members 6 each adhering to the surface 5a of the gel 5 is formed. The covering structure causes stress to cancel deformation of the gel 5 when the gel 5 is deformed due to a change in temperature, pressure, or the like.

At this time, when the coupling between the plurality of covering members 6 is dissociated as a result of not being able to follow the deformation of the gel 5, the magnitude of the stress described above may be changed. This change in stress may lead to a change in characteristics of the pressure sensor.

Further, at a position where the coupling between the plurality of covering members 6 is dissociated, a gap which reaches the surface 5a of the gel 5 occurs. When foreign matter enters the gap and adheres to the gel 5, a change in characteristics of the pressure sensor may be caused.

On the other hand, the plurality of covering members 6 according to a preferred embodiment of the present invention do not couple to each other and thus do not form the covering structure. Therefore, a change in characteristics of the pressure sensor which is caused as described above may be reduced or prevented.

The plurality of covering members 6 may be, for example, silica particles, acrylic based particles, or the like. In this preferred embodiment, the plurality of covering members 6 are silicone particles having a spherical shape or a substantially spherical shape with an average particle diameter of 100.00±1.00 μm. Note that the "average particle diameter" is a particle diameter on a standard particle basis measured by the Coulter counter method.

In the pressure sensor 1 according to this preferred embodiment, since the surface 5a of the gel 5 is covered by the plurality of covering members 6, adhesion of foreign matter to the gel 5 is prevented. Further, since the plurality of covering members 6 are non-adhesive, foreign matter adhering to the covering members 6 may easily be removed. Therefore, a change in characteristics of the pressure sensor 1 may be reduced or prevented.

Moreover, since the plurality of covering members 6 do not couple to each other, the cover structure which is defined by the plurality of covering members 6 each adhering to the surface 5a of the gel 5 cannot be formed. Therefore, since stress against deformation of the gel 5 is not caused, a change in characteristics of the pressure sensor 1 due to a change in stress may be reduced or prevented. Moreover, since foreign matter does not reach the surface 5a of the gel 5 through a gap formed in the covering structure, a change in characteristics of the pressure sensor 1 may be further reduced or prevented.

Moreover, in this preferred embodiment, since each covering member 6 preferably is a particle with a spherical shape or a substantially spherical shape, a contact area between each covering member 6 and the surface 5a of the gel 5 is smaller than when each covering member 6 has another shape. Therefore, adhesion of each covering member 6 to the surface 5a of the gel 5 is less likely to be affected by deformation of the gel 5. That is, during use of the pressure sensor 1, the covering members 6 are less likely to come off from the surface 5a of the gel 5. Therefore, the effect to prevent adhesion of foreign matter to the gel 5 is more reliably provided, and a change in characteristics of the pressure sensor 1 may be further reduced or prevented.

Moreover, in the pressure sensor 1 according to this preferred embodiment, each of the plurality of covering members 6 includes at least one of a silicone particle, a silica particle, and an acrylic based particle. Therefore, the plurality of covering members 6 which are non-adhesive and do not couple to each other can be provided.

Figure 5A:
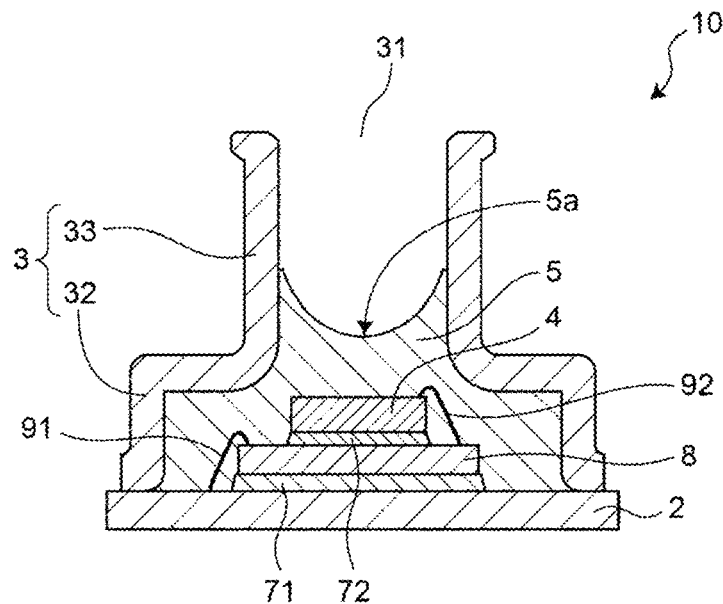
FIG. 5A is a sectional view illustrating one example of a method for manufacturing the pressure sensor in FIG. 1.
Figure 5B:
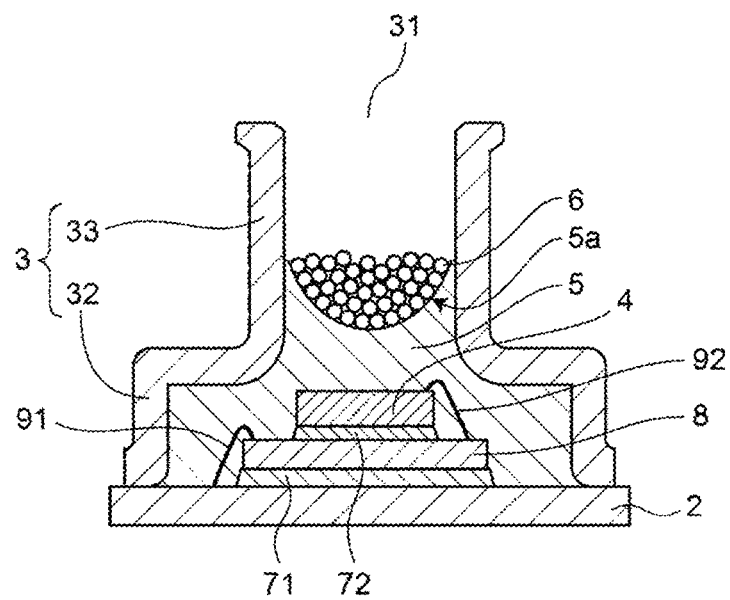
FIG. 5B is a sectional view illustrating the example of the method for manufacturing the pressure sensor in FIG. 1.
Figure 5C:
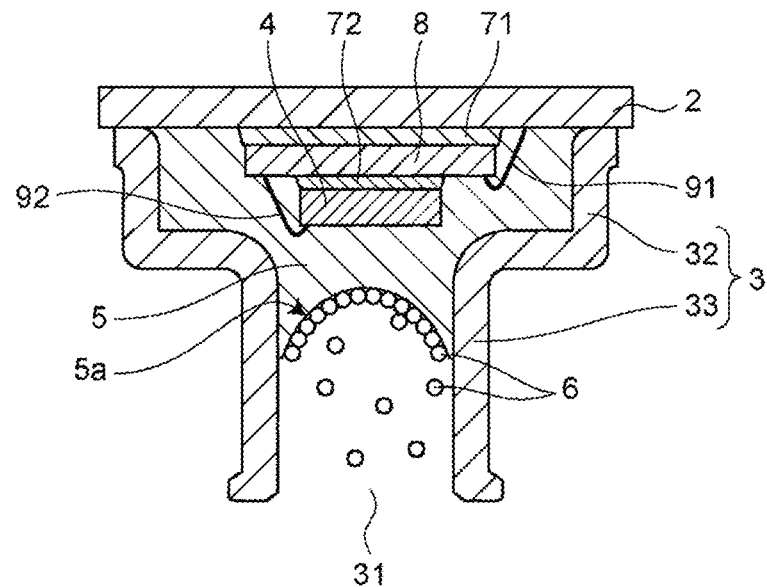
FIG. 5C is a sectional view illustrating the example of the method for manufacturing the pressure sensor in FIG. 1.
Figure 6:
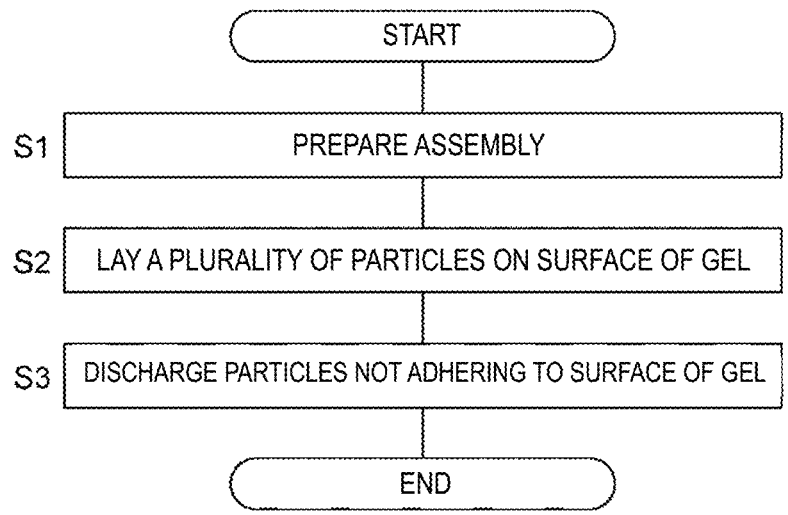
FIG. 6 is a flowchart illustrating the method for manufacturing the pressure sensor according to the first preferred embodiment of the present invention.

Method for Manufacturing Pressure Sensor According to First Preferred Embodiment Next, a non-limiting example of a method for manufacturing the pressure sensor 1 according to the first preferred embodiment of the present invention is described with reference to FIGS. 5A to 5C and FIG. 6. FIGS. 5A to 5C are sectional views illustrating the example of the method for manufacturing the pressure sensor in FIG. 1. FIG. 6 is a flowchart illustrating the method for manufacturing the pressure sensor according to the first preferred embodiment of the present invention.

Preparing Step S1

First, as illustrated in FIG. 5A, an assembly 10 used for the manufacture of the pressure sensor 1 is prepared. The assembly 10 includes the substrate 2, and the tubular member 3 joined at one end portion thereof to one surface of the substrate 2. Inside the tubular member 3, the integrated circuit chip 8 is joined to the substrate 2 with the die attach material 71 interposed therebetween. The pressure sensitive device 4 is joined to the integrated circuit chip 8 with the die attach material 72 interposed therebetween. The substrate 2 and the integrated circuit chip 8 are connected by the bonding wire 91. Moreover, the integrated circuit chip 8 and the pressure sensitive device 4 are connected by the bonding wire 92. The pressure sensitive device 4 and the integrated circuit chip 8 are sealed by the gel 5 provided inside the tubular member 3.

Laying Step S2

Next, as illustrated in FIG. 5B, the plurality of covering members 6 are laid on the surface 5a of the gel 5 through the opening 31. The laying step S2 can be performed by, for example, spraying the plurality of covering members 6 onto the surface 5a of the gel 5 using a spray, a dispenser, or the like.

The plurality of covering members 6 which have reached the surface 5a of the gel 5 adhere to the surface 5a of the gel 5 because of the adhesiveness of the gel 5. On the other hand, covering members 6 not adhering to the surface 5a of the gel 5 but stacked on other covering members 6 are movable in response to external force.

Discharging Step S3

Next, the covering members 6 not adhering to the surface 5a of the gel 5 are discharged through the opening 31. For example, as illustrated in FIG. 5C, the orientation of the assembly 10 is changed such that the opening 31 is directed downward in the gravity direction. Therefore, the covering members 6 not adhering to the surface 5a of the gel 5 fall due to gravity, and are discharged from the opening 31.

Further, vibration may be applied to the assembly 10 while the opening 31 is directed downward in the gravity direction. This allows the covering members 6 not adhering to the surface 5a to fall more reliably.

In this manufacturing method, since the surface 5a of the gel 5 is covered by the plurality of covering members 6, adhesion of foreign matter to the gel 5 is prevented. Therefore, a change in characteristics of the pressure sensor 1 may be reduced or prevented.

Further, in this manufacturing method, since the covering members 6 not adhering to the surface 5a of the gel 5 are discharged, the covering members 6 are prevented from moving above the gel 5 or flowing out from the opening 31 during the use of the pressure sensor 1. Therefore, the magnitude and distribution of the pressure applied to the gel 5 are not changed by the covering members 6 during the use of the pressure sensor 1, and thus, a change in characteristics of the pressure sensor 1 may be reduced or prevented.

Further, in this manufacturing method, each covering member 6 rolls more easily than when each covering member 6 has another shape. Therefore, when the covering members 6 are laid on the surface 5a of the gel 5, each covering member 6 is less likely to stay on another covering member 6, and may more easily reach the surface 5a of the gel 5. If this is utilized, when the plurality of covering members 6 are laid on the surface 5a of the gel 5, each covering member 6 is not required to be disposed at a position determined in advance, and thus the covering members 6 are easier to lay.

Further, since the plurality of covering members 6 can roll so as to fill the gaps therebetween on the surface 5a of the gel 5, the gaps between the covering members 6 are more reliably filled. Therefore, a larger area of the surface 5a of the gel 5 is covered by the plurality of covering members 6. Thus, adhesion of foreign matter to the gel 5 is further prevented, and a change in characteristics of the pressure sensor 1 may be more reliably reduced or prevented.

Second Preferred Embodiment

Figure 4:
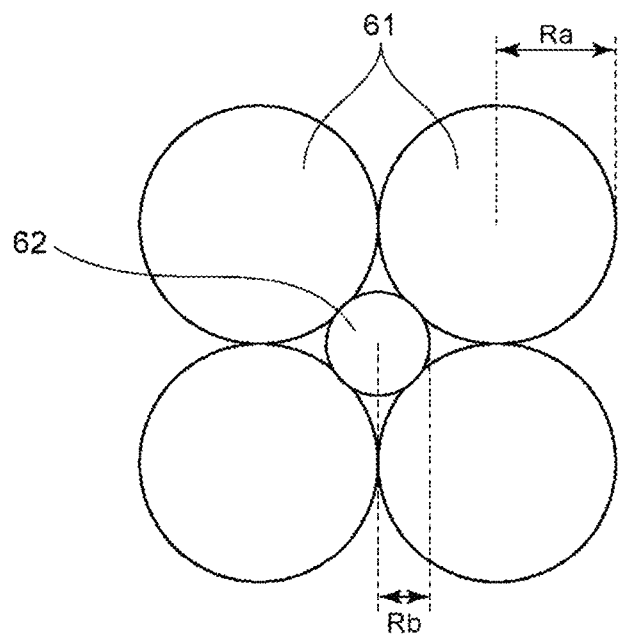
FIG. 4 is a schematic view illustrating the arrangement of a plurality of coating members related to a pressure sensor according to a second preferred embodiment of the present invention.

Next, a pressure sensor according to a second preferred embodiment of the present invention is described with reference to FIG. 4. FIG. 4 is a schematic view illustrating the arrangement of a plurality of coating members related to the pressure sensor according to the second preferred embodiment of the present invention.

The pressure sensor according to the second preferred embodiment is different from the pressure sensor 1 according to the first preferred embodiment in that the plurality of covering members 6 include two or more types of particles with sphere radii different from each other.

The arrangement of the plurality of covering members 6 on the surface 5a of the gel 5 is described below.

In the pressure sensor according to the second preferred embodiment, the plurality of covering members 6 include two types of particles with sphere radii different from each other. That is, the plurality of covering members 6 include large-diameter particles 61 and small-diameter particles 62. The small-diameter particles 62 are one example of a "small covering member".

The sphere radius of the large-diameter particles 61 is larger than the sphere radius of the small-diameter particles 62.

Further, a sphere radius Ra of the large-diameter particles 61 and a sphere radius Rb of the small-diameter particles 62 illustrated in FIG. 4 satisfy the following formula.

$$Rb < (\sqrt{2}-1)Ra \quad \text{Math. 2}$$

In the pressure sensor having such a configuration, as illustrated in FIG. 4, the small-diameter particles 62 may be disposed so as to fill gaps between the large-diameter particles 61 on the surface 5a of the gel 5.

In this preferred embodiment, the large-diameter particles 61 and the small-diameter particles 62 are both silicone particles.

In the pressure sensor according to this preferred embodiment, when the plurality of covering members 6 are laid on the surface 5a of the gel 5, the small-diameter particles 62 may be disposed so as to fill the gaps between the large-diameter particles 61. Therefore, when compared to the case where the plurality of covering members 6 include only the large-diameter particles 61, a larger area of the surface 5a of the gel 5 is covered by the plurality of covering members 6. Thus, adhesion of foreign matter to the gel 5 is further prevented, and a change in characteristics of the pressure sensor may be more reliably reduced or prevented.

Further, in the pressure sensor according to this preferred embodiment, when the plurality of covering members 6 are laid on the surface 5a of the gel 5, the (n+1)-th largest particles (that is, the small-diameter particles 62) may be more reliably positioned in the gaps between the n-th largest particles (that is, the large-diameter particles 61). Therefore, a larger area of the surface 5a of the gel 5 is covered by the plurality of covering members 6. Thus, adhesion of foreign matter to the gel 5 is further prevented, and a change in characteristics of the pressure sensor may be more reliably reduced or prevented.

Figure 7:
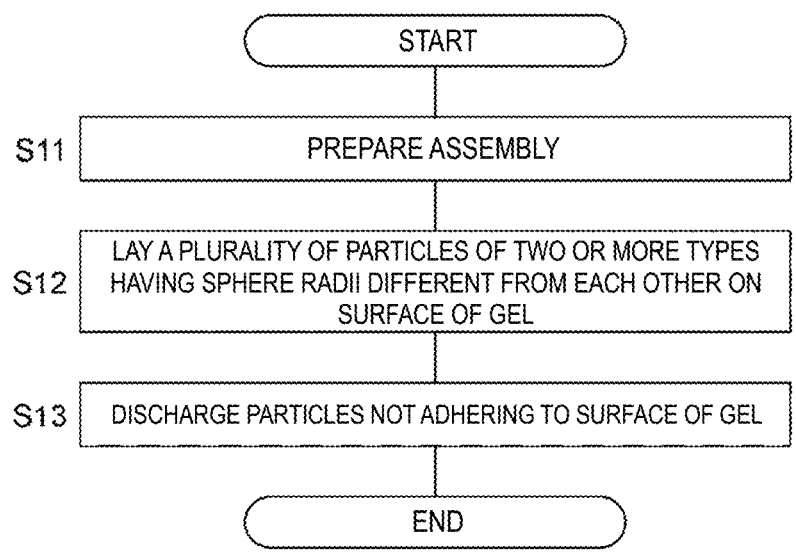
FIG. 7 is a flowchart illustrating a first method for manufacturing the pressure sensor according to the second preferred embodiment of the present invention.

First Method for Manufacturing Pressure Sensor According to Second Preferred Embodiment Next, one example of a method for manufacturing the pressure sensor according to the second preferred embodiment of the present invention is described with reference to FIG. 7. FIG. 7 is a flowchart illustrating a first method for manufacturing the pressure sensor according to the second preferred embodiment of the present invention.

In this manufacturing method, similarly to the manufacturing method described above (FIG. 6), a preparing step S11, a laying step S12, and a discharging step S13 are performed. In the laying step S12, the plurality of large-diameter particles 61 and the plurality of small-diameter particles 62 are laid at the same time. Therefore, in the discharging step S13, large-diameter particles 61 and small-diameter particles 62 not adhering to the surface 5a of the gel 5 are discharged.

In this manufacturing method, the pressure sensor in which the small-diameter particles 62 are disposed so as to fill the gaps between the large-diameter particles 61 on the surface 5a of the gel 5 can be achieved.

Figure 8:
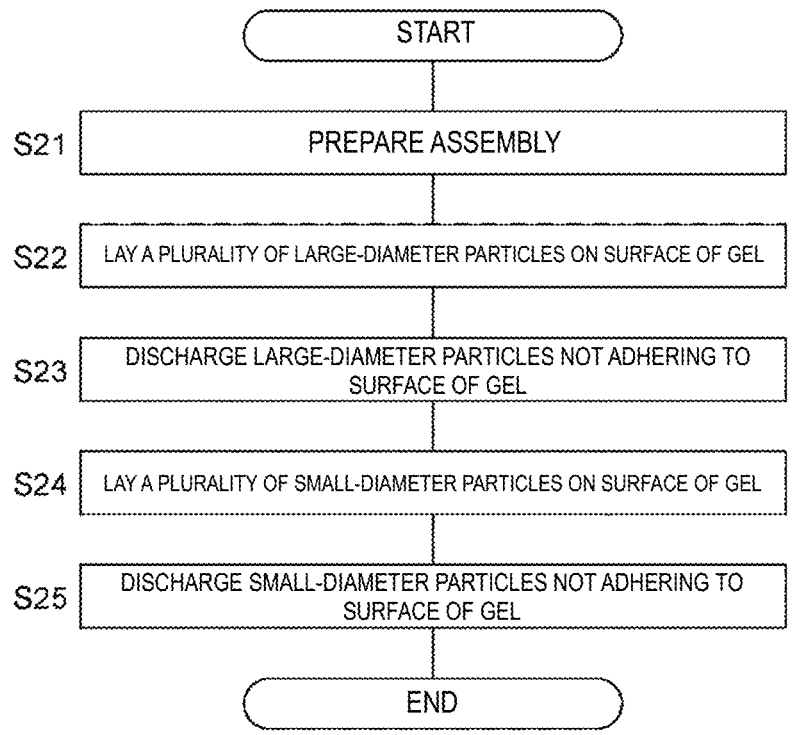
FIG. 8 is a flowchart illustrating a second method for manufacturing the pressure sensor according to the second preferred embodiment of the present invention.

Second Method for Manufacturing Pressure Sensor According to Second Preferred Embodiment Next, another non-limiting example of a method for manufacturing the pressure sensor according to the second preferred embodiment of the present invention is described with reference to FIG. 8. FIG. 8 is a flowchart illustrating a second method for manufacturing the pressure sensor according to the second preferred embodiment of the present invention.

In this manufacturing method, similarly to the manufacturing method described above (FIG. 6), a preparing step S21, a laying step S22, and a discharging step S23 are performed. In the laying step S22, the plurality of large-diameter particles 61 are laid. Therefore, in the discharging step S23, large-diameter particles 61 not adhering to the surface 5a of the gel 5 are discharged.

Additional Laying Step S24

Next, similarly to the laying step S2, the plurality of small-diameter particles 62 are laid on the surface 5a of the gel 5. Therefore, some of the small-diameter particles 62 are disposed so as to fill the gaps between the large-diameter particles 61 and adhere to the surface 5a of the gel 5. On the other hand, small-diameter particles 62 not adhering to the surface 5a of the gel 5 are movable in response to external force.

Additional Discharging Step S25

Next, similarly to the discharging step S3, the small-diameter particles 62 not adhering to the surface 5a of the gel 5 are discharged.

In this manufacturing method, when compared to the case where the plurality of small-diameter particles 62 are laid at the same time as the large-diameter particles 61, the plurality of small-diameter particles 62 may be more reliably disposed in the gaps between the large-diameter particles 61. Therefore, a larger area of the surface 5a of the gel 5 is covered by the large-diameter particles 61 and the small-diameter particles 62. Thus, adhesion of foreign matter to the gel 5 is further prevented, and a change in characteristics of the pressure sensor may be more reliably reduced or prevented.

Further, in this manufacturing method, since the small-diameter particles 62 not adhering to the surface 5a of the gel 5 are discharged, the small-diameter particles 62 are prevented from moving above the gel 5 or flowing out from the opening 31. Therefore, the magnitude and distribution of the pressure applied to the gel 5 are not changed by the small-diameter particles 62 during the use of the pressure sensor, and thus, a change in characteristics of the pressure sensor may be reduced or prevented.

Note that the present invention is not limited to the preferred embodiments described above, but can be embodied in various examples and implementations different from the above preferred embodiments. For example, although in the above description the pressure sensitive device 4 is provided over the integrated circuit chip 8, the present invention is not limited to this. For example, the pressure sensitive device 4 and the integrated circuit chip 8 may each be joined to the substrate 2 and may be disposed side by side.

Further, although in the above description the plurality of covering members 6 have adhered to the surface 5a of the gel 5, the present invention is not limited to this. For example, as illustrated in FIG. 5B, covering members 6 stacked on other covering members 6 and not adhering to the surface 5a of the gel 5 may exist.

Further, although in the above description the plurality of covering members 6 have a spherical shape or a substantially spherical shape with an average particle diameter of about 100.00±1.00 μm, for example, the present invention is not limited to this. For example, each covering member 6 may be a member in which a plurality of particles having a spherical shape or a substantially spherical shape couple to each other. Moreover, the average particle diameter of the plurality of covering members 6 may be smaller or larger than the average particle diameter described above. Alternatively, the covering members 6 may have a shape other than a spherical shape or a substantially spherical shape.

Figure 9:
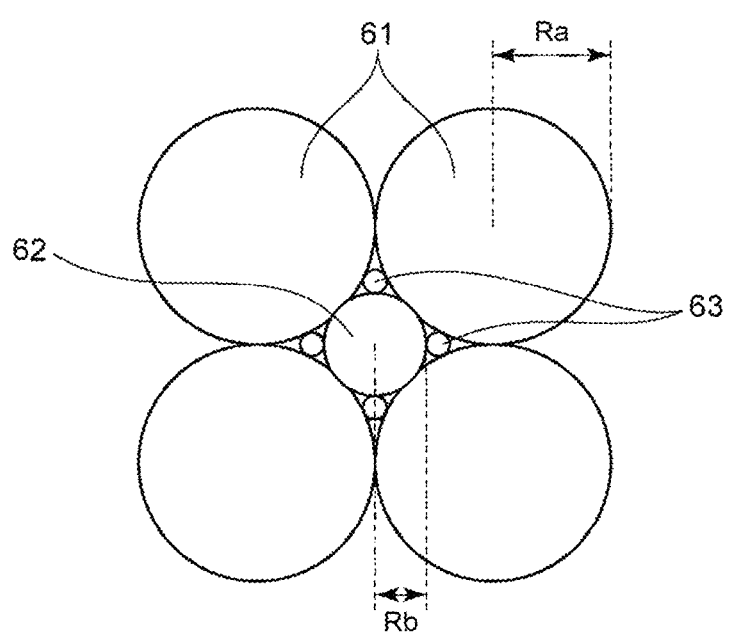
FIG. 9 is a schematic view illustrating the arrangement of the plurality of coating members related to a pressure sensor according to the present invention.

Further, although in the second preferred embodiment the plurality of covering members 6 are two types of particles with sphere radii different from each other, the present invention is not limited to this. For example, the plurality of covering members 6 may be three types of particles with sphere radii different from each other. In this case, as illustrated in FIG. 9, the plurality of covering members 6 include the large-diameter particles 61, the small-diameter particles 62, and fine particles 63. For example, the fine particles 63 may be disposed in gaps between the plurality of large-diameter particles 61 and small-diameter particles 62 and may adhere to the surface 5a of the gel 5.

Further, although in the second preferred embodiment the large-diameter particles 61 and the small-diameter particles 62 are silicone particles, the present invention is not limited to this. For example, the large-diameter particles 61 and the small-diameter particles 62 may be made of materials different from each other.

Further, although in the above description the discharging steps S3, S13, and S23 and the additional discharging step S25 are performed, the present invention is not limited to this. For example, when there are no covering members 6 not adhering to the surface 5a of the gel 5 in the laying steps S2, S12, and S22 and the additional laying step S24, the discharging steps S3, S13, and S23 and the additional discharging step S25 are unnecessary.

The pressure sensors according to preferred embodiments of the present invention and modifications thereof are useful for equipment and apparatuses used in various environments since foreign matter is less likely to adhere to a gel and a change in characteristics of the pressure sensor is reduced or prevented.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A pressure sensor comprising:
a housing with an opening;
a pressure sensitive body inside the housing;
a waterproof gel to seal the pressure sensitive body inside the housing; and
a plurality of cover portions disposed on a surface of the gel; wherein
the plurality of cover portions are non-adhesive and do not couple to each other;
the surface of the gel is covered by the plurality of cover portions; and
the plurality of cover portions are adhered to the surface of the gel.

2. The pressure sensor according to claim 1, wherein the plurality of cover portions include particles with a spherical shape or a substantially spherical shape.

3. The pressure sensor according to claim 2, wherein the plurality of cover portions include two or more types of particles with sphere radii different from each other.

4. The pressure sensor according to claim 3, wherein the plurality of cover portions satisfy a formula:

$$Rb < (\sqrt{2}-1)Ra$$

where Ra is a sphere radius of an n-th largest particle, and Rb is a sphere radius of an (n+1)-th largest particle.

5. The pressure sensor according to claim 2, wherein each of the plurality of cover portions includes at least one of a silicone particle, a silica particle, and an acrylic based particle.

6. The pressure sensor according to claim 1, wherein the housing includes a substrate and a tubular body.

7. The pressure sensor according to claim 6, wherein the pressure sensitive body is on the substrate inside the tubular body and the waterproof gel is provided in the tubular body.

8. The pressure sensor according to claim 6, wherein the substrate is a PCB substrate, a ceramic substrate, or a lead frame.

9. The pressure sensor according to claim 6, wherein the tubular body has a circular cross section, a rectangular cross section, or a polygonal cross section.

10. The pressure sensor according to claim 6, wherein the tubular body includes a larger diameter portion and a smaller diameter portion.

11. The pressure sensor according to claim 6, wherein the tubular body is made of a metal or a ceramic.

12. The pressure sensor according to claim 6, further comprising an integrated circuit chip joined to the substrate in the tubular body.

13. The pressure sensor according to claim 12, wherein the pressure sensitive body and the integrated circuit chip are sealed by the waterproof gel.

14. The pressure sensor according to claim 1, wherein the waterproof gel is a fluorocarbon based gel, a fluorosilicone based gel, or a silicone gel.

15. The pressure sensor according to claim 1, wherein the waterproof gel has adhesiveness.

16. A method for manufacturing a pressure sensor, the method comprising:
preparing an assembly including a housing with an opening, a pressure sensitive body inside the housing, and a waterproof gel to seal the pressure sensitive body inside the housing; and
providing a plurality of cover portions to be disposed on a surface of the gel; wherein
the surface of the gel is covered by the plurality of cover portions; and
the plurality of cover portions are adhered to the surface of the gel.

17. The method for manufacturing a pressure sensor according to claim 16, further comprising discharging, from the opening, a cover portion not adhering to the surface of the gel.

18. The method for manufacturing a pressure sensor according to claim 16, wherein the plurality of cover portions include two or more types of particles with a spherical shape or a substantially spherical shape and sphere radii different from each other.

19. The method for manufacturing a pressure sensor according to claim 16, further comprising laying a plurality of additional cover portions smaller than the cover portions on the surface of the gel.

20. The method for manufacturing a pressure sensor according to claim 19, further comprising discharging, from the opening, a cover portion not adhering to the surface of the gel after the laying.

* * * * *